United States Patent
Karecki et al.

[15] 3,685,690
[45] Aug. 22, 1972

[54] CREDIT CARD AUTOMATIC CURRENCY DISPENSER

[72] Inventors: Marion R. Karecki, Dallas; George R. Chastain, Irving; Thomas R. Barnes, Dallas, all of Tex.

[73] Assignee: Docutel Corporation, Dallas, Tex.

[22] Filed: July 28, 1970

[21] Appl. No.: 58,888

[52] U.S. Cl. .................... 221/218, 194/4 R, 271/57
[51] Int. Cl. ............................................... G07f 11/26
[58] Field of Search ........ 221/9, 10, 12, 13, 206, 194, 221/217, 218, 219, 220, 253, 259; 190/66, 69; 312/232; 271/41, 57; 194/4, DIG. 9; 133/2

[56] References Cited

UNITED STATES PATENTS

| | | | |
|---|---|---|---|
| 3,458,042 | 7/1969 | Mestre | 271/57 X |
| 3,249,354 | 5/1966 | Egnaczak | 271/57 |
| 3,415,348 | 12/1968 | Wahlberg | 194/4 R |
| 3,039,582 | 6/1962 | Simijian | 194/4 E |

*Primary Examiner*—Robert B. Reeves
*Assistant Examiner*—Thomas E. Kocovsky
*Attorney*—Richards, Harris & Hubbard

[57] ABSTRACT

A currency dispenser automatically delivers a medium of exchange in packets in response to a coded credit card presented thereto. The coded credit card is presented to the currency dispenser and an initial check is made to determine if the card has the proper format. After checking the credit card format, coded information thereon is evaluated to check the user's identity prior to authorizing him to receive cash from the machine. When each of several additional checks of the credit card code have been completed, the old code is removed and substituted with a new code. The new code contains the same information as the old but updated to reflect an additional currency dispensing transaction. Both the original code and the updated code are scrambled in accordance with a changing key. Scrambling the credit card code after each use thereof minimizes the chance of unauthorized use of the currency dispenser. When the checks of the credit card code indicate the user is entitled to receive the amount of currency he has selected, a storage container for the packets of currency transports the required number of packets by a positive feed drive to a cash drawer. The cash drawer opens to a detent position which allows the customer to then move the drawer to a fully open position to remove his currency. Upon release of the cash drawer, it returns to a partially opened position from which it automatically closes after a preset time limit.

22 Claims, 17 Drawing Figures

PATENTED AUG 22 1972

INVENTORS:
MARION R. KARECKI
THOMAS R. BARNES
GEORGE R. CHASTAIN

Richards, Harris & Hubbard
ATTORNEYS

PATENTED AUG 22 1972

INVENTORS:
MARION R. KARECKI
THOMAS R. BARNES
GEORGE R. CHASTAIN

Richards, Harris & Hubbard
ATTORNEYS

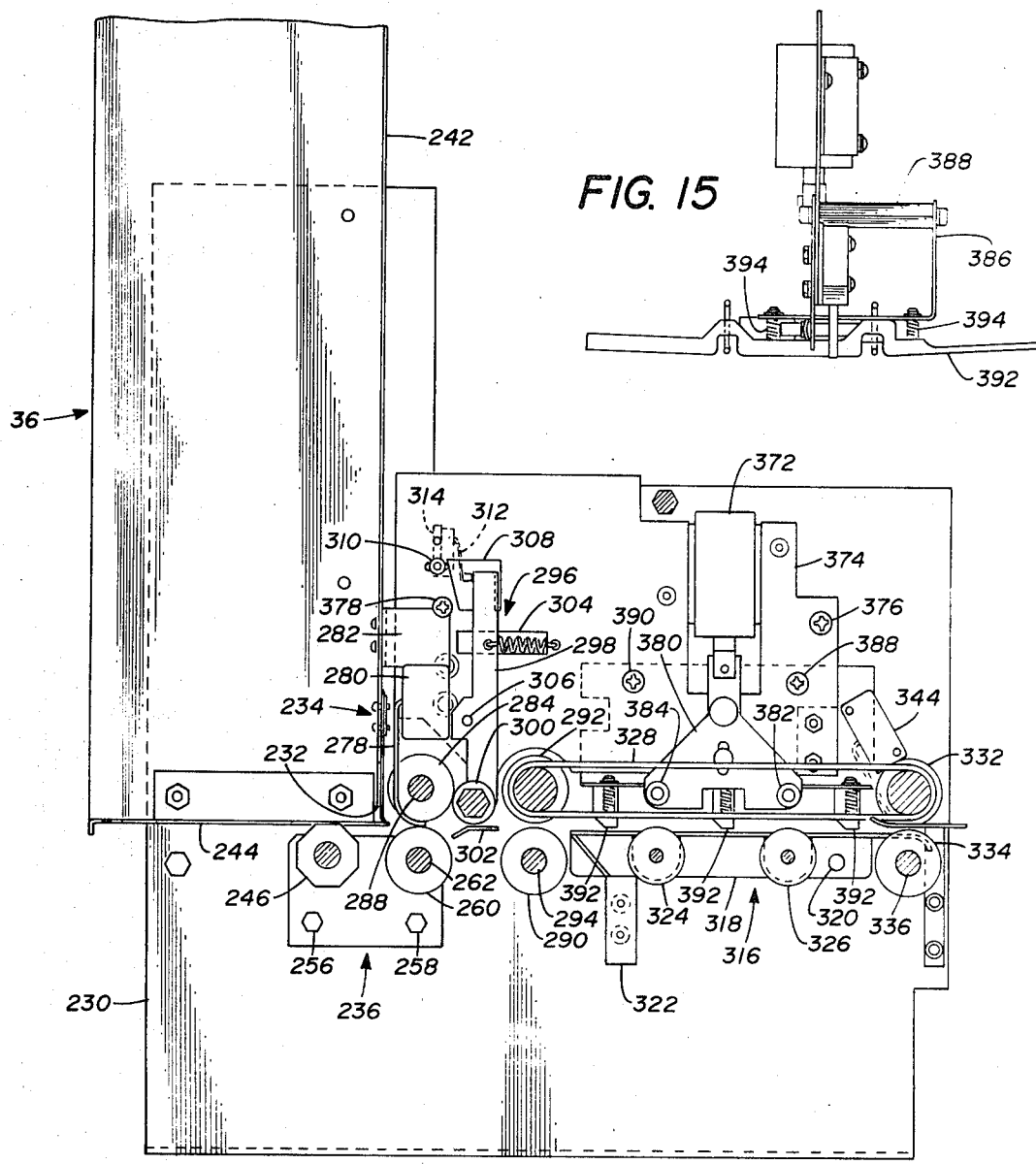
FIG. 15
FIG. 8
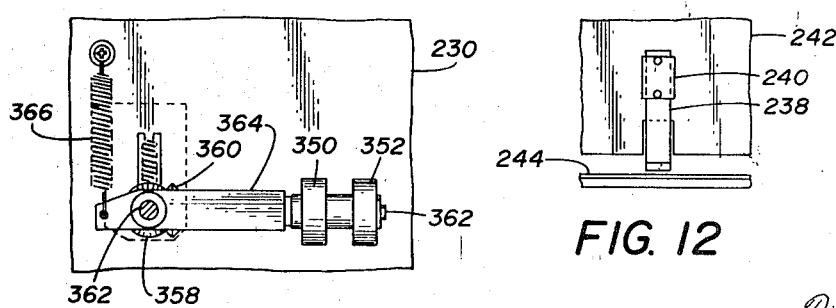
FIG. 14
FIG. 12
INVENTORS:
MARION R. KARECKI
THOMAS R. BARNES
GEORGE R. CHASTAIN
Richards, Harris & Hubbard
ATTORNEY

INVENTORS:
MARION R. KARECKI
THOMAS R. BARNES
GEORGE R. CHASTAIN

Richards, Harris & Hubbard
ATTORNEYS

CREDIT CARD AUTOMATIC CURRENCY DISPENSER

This invention relates to a currency dispenser, and more particularly to a coded document-actuated currency dispenser.

Recent studies have shown that attempts are being made by the banking system to influence the general public to use fewer checks in their financial transactions. This is primarily due to the difficulty of handling and processing large amounts of paper. In its place, there appears to be a wider use of credit cards for the completion of daily household and business transactions. Although there is a continued heavy use of checks and an increasing use of credit cards, we are not likely to become a cashless society in the near future. To provide the required amount of cash to complete some business and personal transactions, banks, in the past, have opened more and more branches for customer convenience. Unfortunately, the construction and operation of these many branch banks is expensive and unprofitable.

To provide the consumer with a source of ready cash without the expense of branch banking, banks are resorting to the use of automatic currency dispensing machines that make cash available to bank customers on a 24 hour basis.

Heretofore, the available automatic currency dispensing machines lacked compatibility with bank credit cards and the convenience and speed of data processing. With many of the prior currency dispensing machines, the customer was required to yield up his identification card with each use, thereby creating handling problems and costs for the bank which were of equal magnitude with the present day check handling problems and costs. Other available machines required the customer to carry a supply of check-like vouchers, which he and the bank must replenish periodically as required. Again, this presented many of the same problems currently experienced when handling checks. Of prime importance, of course, in the operation of any automatic money dispenser is the security of the stored cash. To be acceptable, an automatic cash dispenser must be essentially tamperproof.

An object of the present invention is to provide a coded document activated automatic dispenser. Another object of the present invention is to provide a code actuated automatic currency dispensing machine. A further object of this invention is to provide code scrambling security in a code actuated dispenser. Still another object of this invention is to provide positive feed delivery in automatic dispensing apparatus. A still further object of this invention is to provide controlled, timed, sequential operation of a dispensing drawer in automatic dispensing apparatus.

In an automatic dispenser, a coded document is presented to the machine by a user. Initially, the machine performs a format check on the document to determine if the machine will properly respond. If the coded document presented is not of the correct format, it will be locked out thereby protecting the machine from an attempt to force an unauthorized document into the mechanism. If the initial check indicates the presented document has the proper format, a gate opens to permit the user to further insert the document into the machine for actuation thereof.

Upon the acceptance of a coded document by the dispensing apparatus of the present invention, the document proceeds to a first station where scrambled coded information stored thereon is read and sent to unscrambling logic. A customer's personal identification code as read from the presented document is checked by comparison with a code manually inserted by the user. If the coded customer identification number and the inserted identification number do not agree, the user is instructed to re-enter his personal code. This operation will be repeated until the customer inserts the correct code or a favorable comparison does not result after three attempts. If on the third attempt the stored code and the entered code do not agree, the coded document is transported to an internal storage bin and not returned to the user. When the customer enters an identification code which corresponds to that stored on the document presented, the date of last use, the number of previous uses in the same day, the total number of uses remaining, and the expiration date of the document are all checked. If the result of these checks indicates the user is entitled to receive the article to be dispensed, he is so informed and the document is recoded, with the data thereon updated to reflect the latest transaction.

After the code on the document as presented is read and sent to the unscrambling logic, an unscrambler converts the data into a series of separate, logically arranged data words. These data words, after being checked and updated as explained previously, are rescrambled in accordance with a scrambling key to produce a code arrangement different from the arrangement as read. Upon completion of the rescrambling, the document is recoded with the updated scrambled data. The code changing logic also includes circuitry for generating a different scrambling key for subsequent readings of the same coded documents.

In an automatic dispenser in accordance with the present invention, after the coded document has been returned to a user, a positive feed delivery system removes the article to be dispensed from a storage container. The positive feed system includes an adjustable gate for accurately metering the dispensed article. After leaving the storage container through the metering gate, the article is transported between pinch rollers and a series of belted rollers to a dispensing drawer. This drawer is actuated by an energizing signal from circuitry in response to the user removing the presented document from the machine.

To complete the automatic dispensing operation of the dispenser in accordance with the present invention, an article is deposited into the dispensing drawer. Initially, a signal energizes an actuator to position the drawer from a retracted, closed position to a partially opened detent position from which it may be drawn to a full open position by the user. After the user has removed the article and releases the drawer, it automatically returns to the partially opened detent position. A timer measures the time the drawer is in the detent position, and after a preselected interval, as governed by the timer, it returns to the closed position. If, upon initially positioning the drawer to the partially opened detent position, the user does not pull the drawer to the fully open position before the expiration of a preselected time interval, the drawer will be returned to the closed position.

A more complete understanding of the invention and its advantages will be apparent from the specification and claims and from the accompanying drawings illustrative of the invention.

Referring to the drawings:

FIG. 8 is a side view in section of a cash transport for the currency dispenser of FIG. 1;

FIG. 12 is a front view of a metering gate at the outlet port of the container of the cash transport of FIG. 8;

FIG. 14 is a side view of a printed receipt feed roller for cooperation with the pinch rollers of the cash transport;

FIG. 15 is a side view of a printed receipt feeder assembly of the transport system as illustrated in FIG. 8;

GENERAL SYSTEM DESCRIPTION

Figure 1:
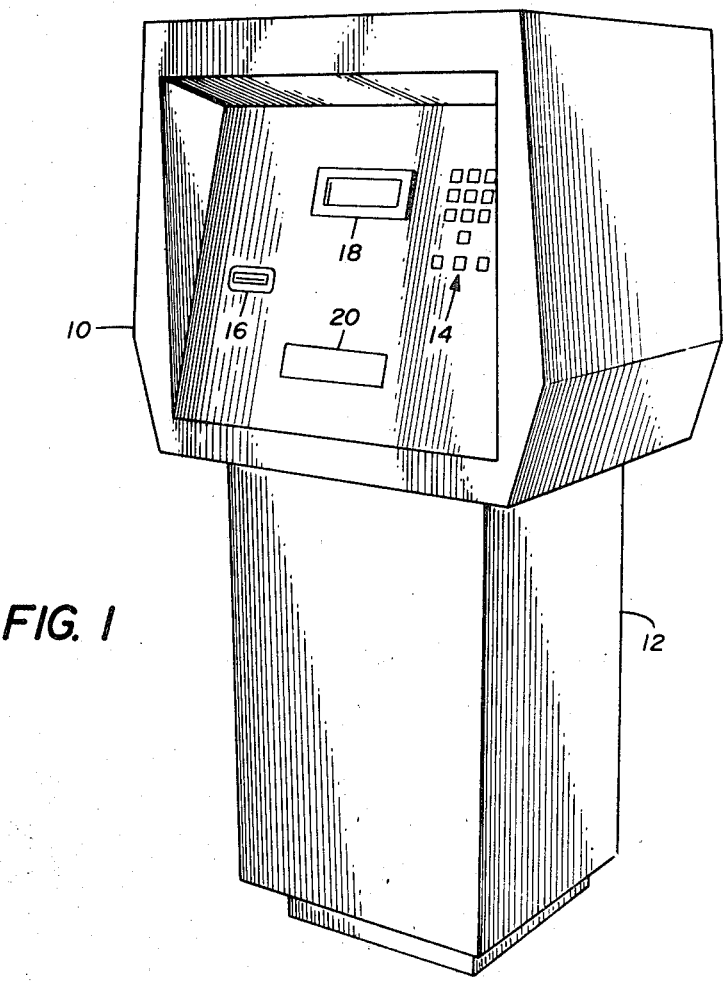
FIG. 1 is a pictorial view of a currency dispenser in accordance with the present invention.

Referring to FIG. 1, there is shown a free standing currency dispenser including a console 10 which houses mechanical operating sections of the system, and in addition customer interface equipment. In the free standing unit, the console 10 is mounted on top of an electronic module 12 which houses the system electronics and power supply. On the front panel of the console 10, there is arranged an array of 13 push button keys 14 for use by a customer to interface with the currency dispenser. Ten of these keys, marked 0 through 9, are to enable a user to insert his assigned identification code for verification of his authority to use a credit card presented to the machine through a card gate 16. One of the remaining three keys is a "clear" push button for correcting mistakes made by the user in inserting his assigned identification code. The remaining two keys are for selecting one or two currency packages to be dispensed. The amount of currency in each such package is controlled by authorized personnel.

In addition to the 13 push button keys, and the card gate 16, the front panel of the console 10 includes an instruction window display 18 that provides for viewing an illuminated display message drum. As will be explained, the messages on this drum instruct a user in the operation of the currency dispenser. The last user interface on the front panel of the console 10 is a cash drawer 20 that fits flush with the panel in a closed and locked position.

Figure 2:
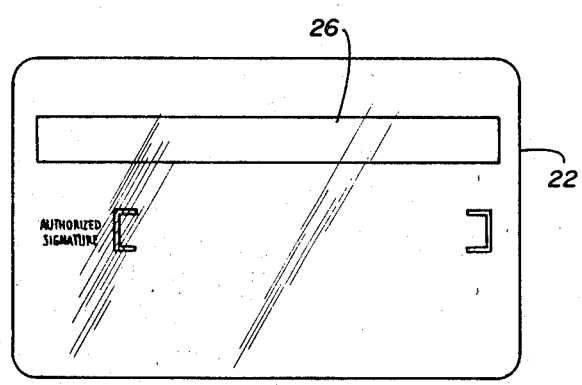
FIG. 2 illustrates a typical credit card for use with the currency dispenser of FIG. 1.

Upon presentation of a credit card 22, such as illustrated in FIG. 2, through the card gate 16 to the console 10, it is transported to a plurality of reading stations by a card reader 24 to activate the various systems in a preordered sequence. Typically, a currency dispenser in accordance with the present invention may be activated by a standard "A" size plastic credit card with a stripe 26 of magnetic material located on the backside. The magnetic stripe allows up to eighty numeric characters in four rows to be magnetically encoded for use in providing a complete identification and record of each transaction with the currency dispenser. A magnetic credit card for use in the system described contains the following information:

a. Expiration Date (Year [two digits] and Month [two digits]),
b. Total Allowed Uses (Up to 999 [three digits]),
c. Allowed Uses Per Day (Up to nine [one digit]),
d. Account Number (Variable from six to 14 digits),
e. Customer Identification Code (six digits),
f. Bank Routing and Transit Number (eight digits),
g. Date Last Used (Month [two digits], Day [two digits]), and number of times used per day (one digit),
h. Bank Identification Number (four digits), and
i. Bank Branch Number (three digits).

As the credit card 22 moves through the card reader 24, each of the above pieces of information is checked at one of several reading stations. Although many credit card readers are available, the card reader illustrated includes a drive motor 27 activated by a signal from the electronic module 12 and coupled to a series of drive rollers through a belt 28. The series of rollers comprises pinch roller pairs distributed longitudinally along the length of travel of a credit card. In addition to reading stations responsive to the magnetically coded information on the stripe 26, the card reader 24 also includes writing stations for recoding a credit card during completion of a currency dispensing operation.

In the normal currency dispensing cycle, a credit card is transported through the card reader 24 in one direction during a first part of a sequence and then returned to the user through the card gate 16 at the second-to-last step in the completion of a cycle. Under certain circumstances, a credit card presented to the machine is retained and not returned to the user. A card retained by the machine is transported through the card reader 24 into an internal storage bin 30. This bin is accessible only to authorized persons having access to the inside of the console 10.

Figure 3:
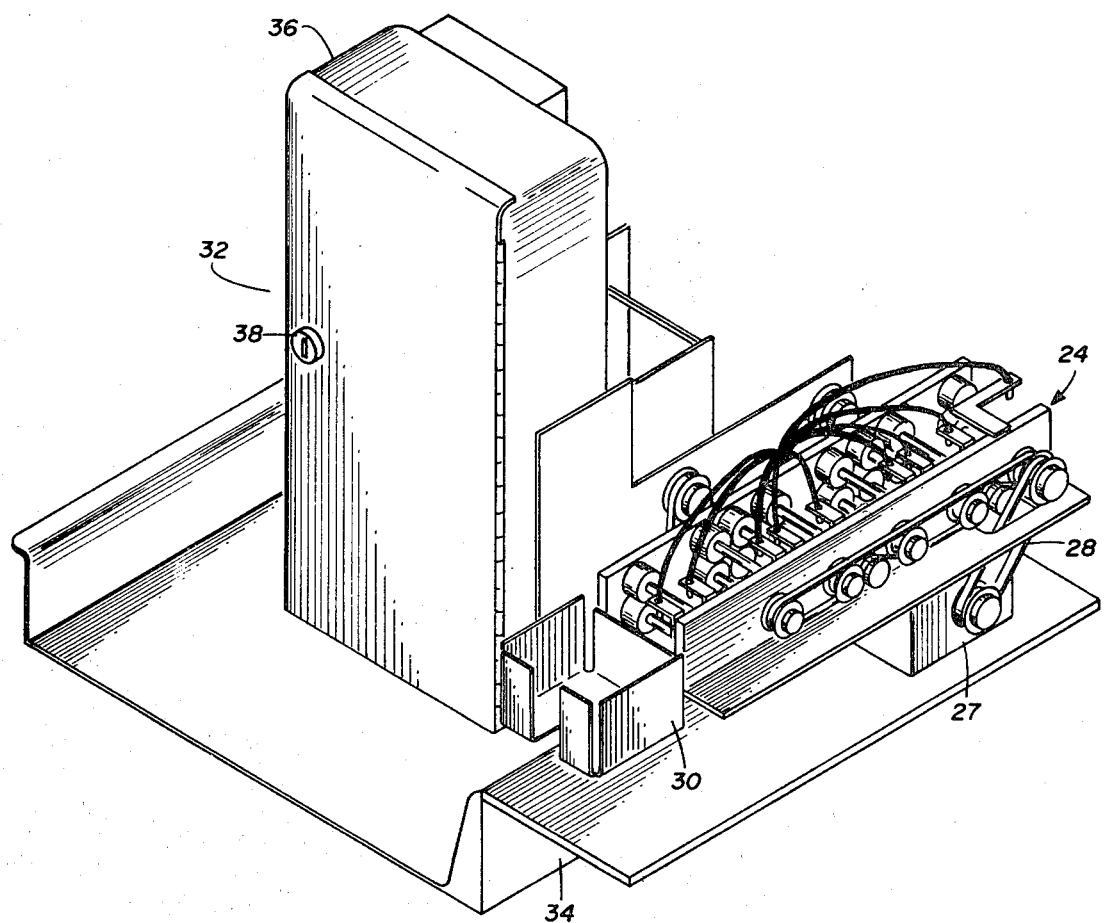
FIG. 3 is a perspective view of a currency packet delivery system and credit card transport system for the dispenser of FIG. 1.

After several verification steps have determined a user is entitled to the currency he has requested, a cash transport 32 is activated by a signal from the electronic module 12 to deliver packets of currency to the cash drawer 20. As illustrated in FIG. 3, the cash transport 32 is mounted alongside the card reader 24 on an equipment rack 34 contained within the console 10.

Currency to be dispensed is stored in a cabinet 36 having an opening for feeding packets of currency to a money transport system, as will be explained. Although the console 10 contains security locks to restrict unauthorized entry into the unit, the cabinet 36 also includes a lock 38 for securing money packets stored within the cabinet.

Figure 4:
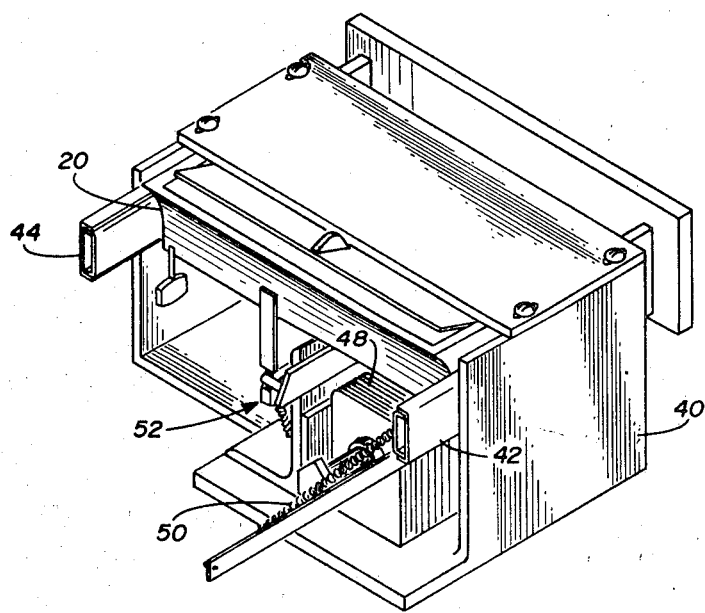
FIG. 4 is a perspective view of the cash drawer for the dispenser of FIG. 1.

Money packets delivered from the cash transport 32 in response to instructions from the electronic module 12 are delivered to the cash drawer 20 included as part of a separate subsystem as illustrated in FIG. 4. The cash drawer 20 is contained within a housing 40 and moves between a closed position as illustrated in FIG. 1 to a partially opened position as illustrated in FIG. 4 along tracks 42 and 44. In addition to numerous switches for sensing the operation of the cash drawer 20, the housing 40 contains a linear motor 48 for forcing the drawer from a closed position to a detent position, as will be explained. Upon receipt of a control signal from the electronic module 12, a latch solenoid is energized and allows a spring 50 to return the drawer 20 to the closed position. A latch mechanism, generally indicated by the numeral 52, locks the drawer 20 in the closed position.

GENERAL SYSTEM OPERATION

In operation of the console 10 and the electronic module 12 to dispense currency to a user, the display 18 instructs a customer to insert his credit card into the card gate 16. This is the first step in a sequence of step-by-step operating instructions leading to a completed transaction.

A second instruction appearing at the display 18 instructs a user to key-in his identification code. This requires that the customer's personal identification number be entered by means of the numbered push button keys 14. By operation of the electronic module 12, the keyed-in number is verified with the number magnetically encoded on the stripe 26 of the customer's credit card 22. If the wrong keys are accidentally pressed before completing a number, the "clear" key is provided to allow the user to try again. On the third incorrect attempt at verification, the card reader 24 delivers the inserted credit card to the bin 30. (This feature is a safeguard against the use of lost or stolen cards.) In this situation, an instruction will appear at the display 18 telling a customer his card has been retained. A printed receipt is then issued telling the user why his card has not been returned.

Following verification, the message "Key In Amount Desired" appears in the lighted display 18. The user now selects one of two fixed amounts, prepackaged in the cash transport 32, by means of one of two currency-amount key push buttons 14. The requested cash amount is delivered to the cash drawer 20 along with a receipt of the transaction. A receipt is printed and issued to a user upon the termination of each transaction whether the transaction has been completed by the dispensing of currency or by a machine detected error. In the latter situation, the receipt explains to the user why currency was not dispensed.

Upon delivery of the currency and the receipt to the cash drawer 20, the electronic module 12 generates a signal to automatically open the cash drawer to a detent position for delivery of the cash and receipt to the user. The cash drawer 20 must be manually extended to facilitate removal of its contents, after which it is automatically retracted and locked by means of the spring 50 and the latch 52. Upon completion of the latching of the drawer 20, the transaction has been completed and the machine is ready for a subsequent transaction.

DETAILED OPERATING SEQUENCE

Figure 5:
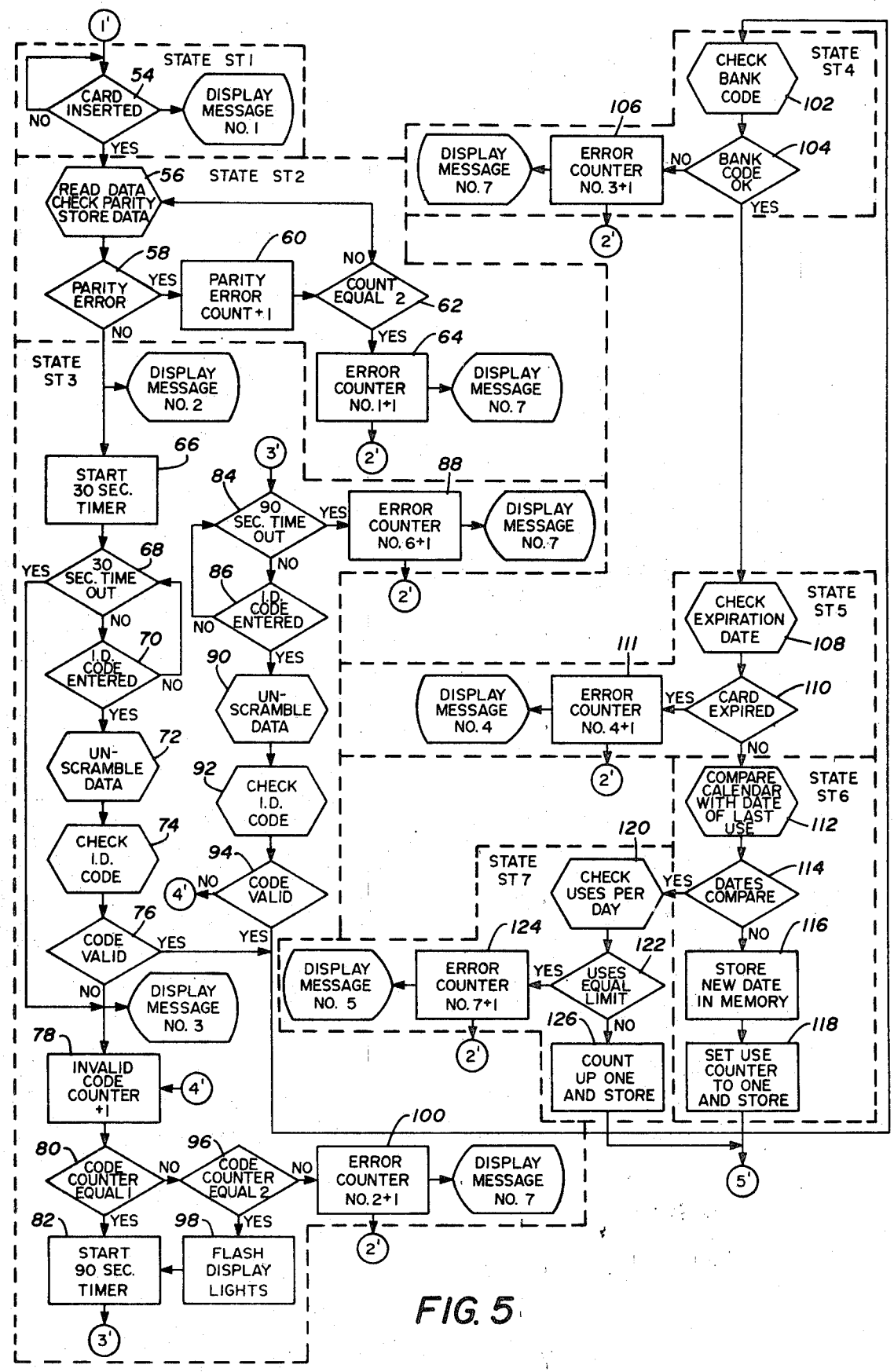
FIGS. 5 through 7 illustrate a flow diagram giving the steps in the operation of the currency dispenser for money delivery to a user of a valid credit card.
Figure 6:
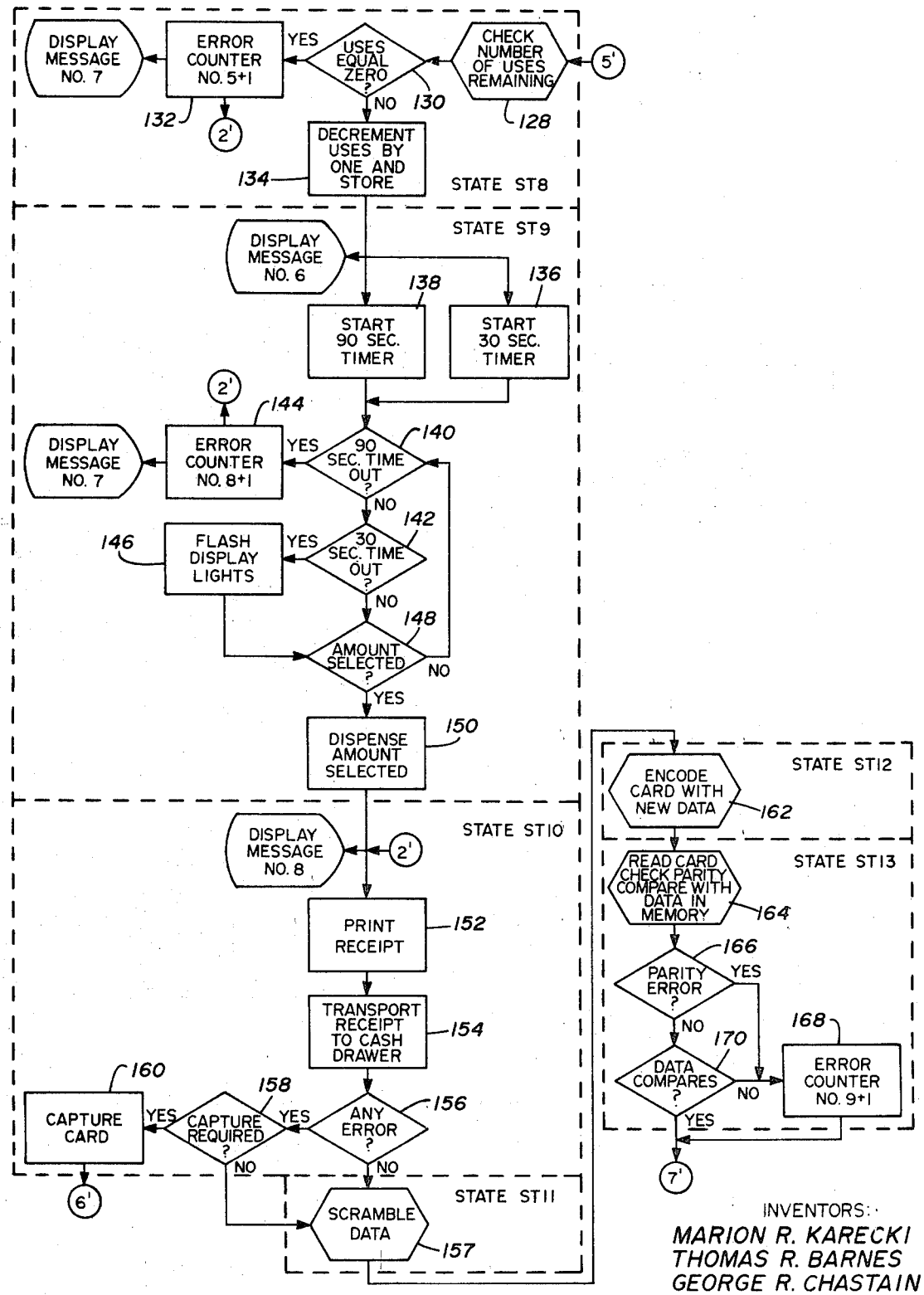
Figure 7:
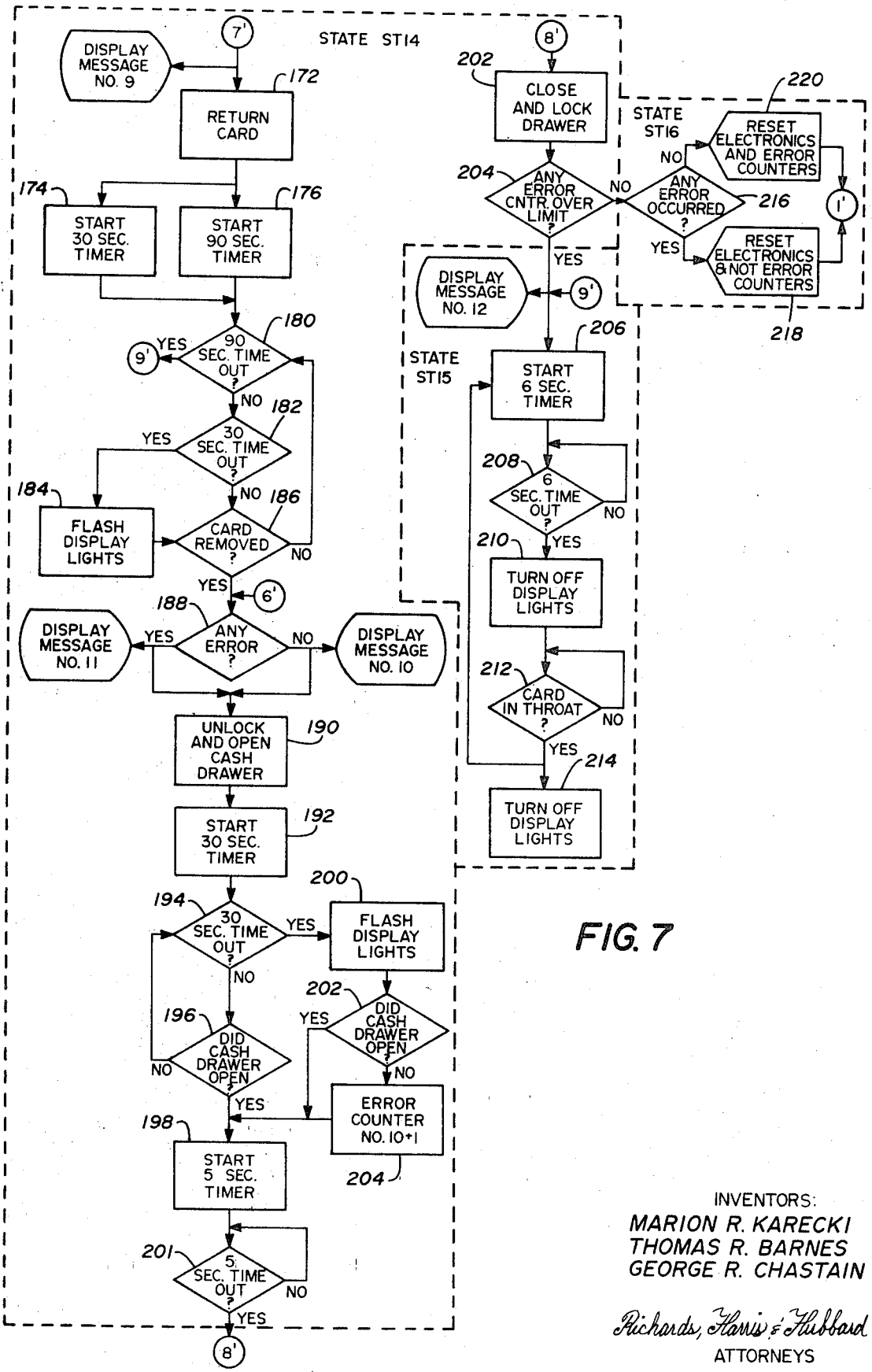
Figure 9:
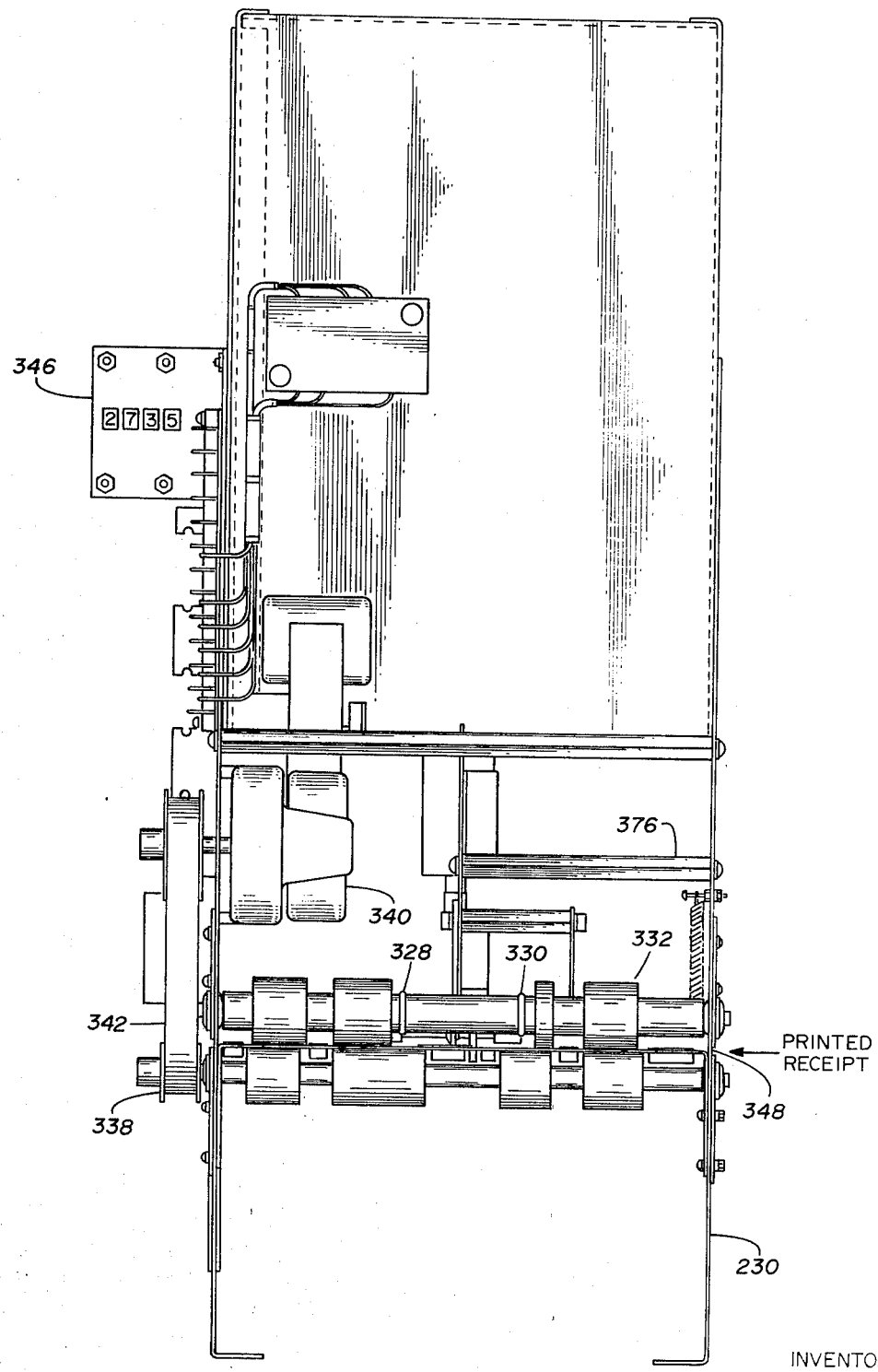
FIG. 9 is a front view of the cash transport of FIG. 8.

For a detailed operation of the step-by-step sequence of the currency dispenser, reference is made to FIGS. 5 through 7.

In the initial state (ST1) of the currency dispenser, message No. 1 of Table I will appear at the display 18. Electronic module 12 activates an inquiry 54 to determine if a card has been inserted through the gate 16 after the card format has been checked.

TABLE I

DISPLAY MESSAGES

1. Insert Card
2. Enter I.D. Code
3. Enter I.D. Code Again
4. Card Has Expired
5. Uses Per Day Exceeded
6. Select Amount Desired
7. Transaction Not Complete — Bank Will contact you
8. Receipt Being Printed
9. Remove Card
10. Remove Currency and Receipt
11. Remove Receipt
12. Out of Order Upon a positive response from the inquiry 54, the sequence proceeds to state ST2. In state ST2, the card reader 24 positions the advancing credit card, and the module 12 completes step 56 to read the scrambled data from the inserted card, check the parity, and store the data read from the stripe 26. State ST2 continues with the inquiry 58 to determine if a parity error exists. A positive response to the inquiry 58 advances the sequence of state ST2 to step 60 and then to inquiry 62. A "yes" response to inquiry 62 advances state ST2 to step 64 to cause message No. 7 of Table I to appear at the display 18. Step 64 also advances the sequence of operation to state ST10; state ST10 will be explained shortly. A "no" response to inquiry 62 returns state ST2 to step 56 and in turn to inquiry 58.

Step 64 makes a check to determine the number of times a parity error has produced a "yes" response to the inquiry 64. If he number of times step 64 has been reached equals an internally set limit, error counter No. 1 of Table 2, then the machine will terminate the present transaction and shut down. For error counter No. 1, on the seventh attempted successive use of the machine which results in a "yes" response to inquiry 62, the machine will shut down. After each successful completion, however, the error counter will reset to zero.

TABLE II

ERROR COUNTER LIMITS

| Counter No. | Limit |
| --- | --- |
| 1. Parity Error | 6 |
| 2. Invalid I.D. Code | 3 |
| 3. Invalid Bank Code | 6 |
| 4. Expired Card | 3 |
| 5. Total Uses Exceeded | 6 |

| | |
|---|---|
| 6. Too Much Time Used to Key In I.D. Code | 3 |
| 7. Uses Per Day Exceeded | 6 |
| 8. Too Much Time Used To Select Amount | 2 |
| 9. Echo Check Error | 3 |
| 10. Drawer Did Not Open | 2 |

A negative response to the "parity error" inquiry 58 advances the sequence of operation to state ST3. Initially, in state ST3, message No. 2 of Table I appears at the display 18. Simultaneously a 30 second timer, step 66, is initiated by the electronic module 12. Message No. 2 instructs a user to enter his personal identification number into the machine by means of the push button keys 14. When the user is inserting his personal identification number into the machine, the sequence of operation advances to inquiry 68 to determine if the 30 second limit of step 66 has been exceeded. A "no" response to inquiry 68 advances state ST3 to inquiry 70 to determine if a user's identification code has been entered. If the response to inquiry 70 is "no," the sequence returns to inquiry 68. Inquiries 68 and 70 are continually repeated until either one or the other produces a "yes" response.

A positive response from inquiry 70, indicating that a code has been entered, advances state ST3 to step 72 wherein the scrambled coded data, as read from the magnetic stripe 26, is unscrambled. After unscrambling the data from the stripe 26, the sequence advances to step 74 wherein a comparison of the customer-entered identification code with the card identification code is made. Upon completion of the comparison step 74, the electronic module 12 advances the sequence to inquiry 76 to determine if the customer-entered code and the code read from the magnetic stripe 26 are identical. A "no" response to inquiry 76 advances state ST3 to step 78 and causes message No. 3 of Table I to appear at the display 18. State ST3 is also advanced to this same position upon a "yes" response to inquiry 68 indicating that the thirty second timer 66 has timed out.

Step 78 is completed by the electronic module 12 to determine the number of times an incorrect identification code has been entered by the user. This determination is checked by inquiry 80. Upon the first entering of an incorrect identification code by a user, inquiry 80 produces a positive response advancing state ST3 to step 82 which starts a 90 second timer. At this time, the user is instructed to re-enter his identification code through the push button keys 14 in response to message No. 3 appearing at the display 18. The cycle of operation continues at inquiry 84 with the sequence being continuous between step 82 and inquiry 84. A "no" response to inquiry 84 advances the sequence to inquiry 86 to determine if an identification code has been entered. Inquiries 84 and 86 are continuously cycled until either one or the other produces a "yes" response.

A "yes" response to inquiry 84 indicates that the ninety second timer 82 has timed out and state ST3 advances to step 88. Upon completion of step 88, the sequence advances to state ST10 and the transaction is terminated. As a result of state ST3 advancing to step 88, message No. 7 of Table I appears at the display 18.

Step 88 checks to determine how many previous cycles, i.e., previous uses of the machine, have advanced to that point as a result of timing out of the ninety second timer. When the number of times the sequence has advanced to step 88 equals a set error number, the machine will terminate the present transaction and shut down. For a time out error, the machine will shut down after the fourth sequence, error counter No. 6 of Table II, in succession has advanced to step 88 as a result of the 90 second timer timing out.

A "yes" response to the inquiry 86 advances state ST3 to step 90 wherein the data read from the magnetic stripe 26 and stored in step 56 is unscrambled. After completing the unscrambling step 90, the sequence advances to step 92 where the entered identification code and the unscrambled code are compared. This advances state ST3 to inquiry 94 which is made to determine if the user-entered code and the credit card code favorably compare.

A "no" response to the inquiry 94 returns state ST3 to step 78. Inquiry 80 is again made and the response this time will be negative, advancing state ST3 to inquiry 96. This being the second attempt to insert the correct identification code, inquiry 96 produces a "yes" response advancing state ST3 to step 98 which causes the display 18 to flash message No. 3 and return the sequence to the 90 second timer, step 82. The sequence of steps of inquiries 84 through 94 is repeated. Another "no" response to inquiry 94 again returns the sequence to step 78 and inquiries 80 and 96 are again made. At this time, inquiry 98 will result in a "no" response advancing state ST3 to step 100. In step 100, the electronic module 12 makes an error limit check to determine how many times state ST3 has advanced to this position. When the number of times that state ST3 has advanced to step 100 equals a stored limit, the machine will shut down upon completion of the present transaction. For step 100, the error counter No. 2 of Table II gives the number of successive times an incorrect I.D. code will shut down the machine. The present transaction advances to state ST10 and message No. 7 of Table I appears at the display 18. If this is not the fourth successive attempt to use the machine, the present transaction will be terminated and the machine will be returned to the initial state.

A positive response to either inquiry 76 or inquiry 94, indicating a valid code has been entered through the push button keys 14, advances the transaction to step 102 of state ST4. In step 102, the module 12 compares the bank code read from the magnetic stripe 26 of the inserted credit card, after unscrambling, with a bank code stored in the module 12. Upon completion of step 102, state ST4 advances to inquiry 104. A "no" response to inquiry 104 advances the sequence to step 106 and message No. 7 of Table I appears at the display 18. Step 106 compares the number of times the overall sequence has advanced to that state with a preset limit, error counter 3 of Table II. If the number of times the sequence advances to step 106 does not equal the stored limit, the sequence advances to state ST10 and completes the transaction. If the error limit plus one has been reached, the machine will shut down.

A "yes" response to inquiry 104 completes state ST4 and advances the sequence to state ST5. Initially, in state ST5, step 108 is completed. Step 108 is a further check on the data read from the magnetic stripe 26. Step 108 compares the expiration date of the credit card with the calendar date. Inquiry 110 is made and a positive response advances state ST5 to step 111 and message No. 4 of Table I appears at the display 18. In step 111, the module 12 determines the number of times the sequence has advanced to this point, error counter 4 of Table II. If the sequence advances to step 111 once more than the number of times as stored in the module 12, the sequence advances to state ST10 and shuts down. If there has been three or less successive sequences advanced to step 111, the present transaction will be completed and the machine returned to the initial state. A "no" response to inquiry 110 completes state ST5 and advances the operation to state ST6.

In state ST6, the first operation, step 112, compares the calendar date with the date of last use as read from the magnetic stripe 26. If the calendar date does not agree with the date of last use, indicating the card has not been used that day, inquiry 114 results in a "no" response and state ST6 advances to step 116. Step 116 stores the calendar date in a memory of the electronic module 12 for subsequent encoding on the magnetic stripe 26. Upon completion of storage of the calendar date, state ST6 advances to step 118. Step 118 sets a use counter to 1 and stores this information in a memory for subsequently encoding on the magnetic stripe 26.

A "yes" response to the inquiry 114, indicating that the card has been previously used on the calendar date, advances the sequence from state ST6 to state ST7. In state ST7, step 120 compares the number of uses made for that day with an established use limit. If the number of uses of the card in the card reader 24 equals the established limit, an inquiry 122 results in a "yes" response thereby advancing state ST7 to step 124 and message No. 5 of Table I appears at the display 18. In step 124, the electronic module 12 compares the number of times the sequence has advanced to that point with a stored number, error counter 7 of Table II. If state ST7 advances to step 124 by an amount equal to the stored limit plus one, indicating seven successive uses of the machine have advanced the sequence to step 124, the machine will complete the present transaction by advancing to state ST10 and then shut down. If less than seven successive uses has advanced the sequence to step 124, the present transaction will be completed through state ST10 and the machine returned to the initial state.

A "no" response to inquiry 122 advances state ST7 to step 126 which adds another use to the total number of uses per day and stores this information for subsequent encoding on the magnetic stripe 26.

Upon completion of either step 118 of state ST6 or step 126 of state ST7, the machine operation advances to state ST8, as appears in FIG. 6. Initially, in state ST8, step 128 compares the number of total uses made of the credit card with the total number of allowed uses. Note that this is not the uses allowed per day, but rather the total number of uses that can be made of a credit card. If the number of total uses remaining equals zero, an inquiry 130 results in a "yes" response advancing state ST8 to step 132 and causing message No. 7 of Table I to appear at the display 18. In step 132, the electronic module 12 checks to determine the number of times state ST8 has advanced to this point, error counter 5 of Table II. If it has advanced to the total number of times allowed, the sequence will advance to state ST10 and complete the present transaction by retaining the card and printing a receipt advising the user his card has been retained. A "no" response to the inquiry 130 indicates that another use of the credit card 22 remains and state ST8 advances to step 134. Step 134 reduces the total number of remaining uses by 1 and advances the sequence to state ST9.

Initially, in state ST9, message No. 6 of Table I appears at the display 18 and the 30 second timer of step 136 and the 90 second timer of step 138 are activated. Electronic module 12 monitors both the 90 second timer, step 138, and the thirty second timer, step 136, by inquiries 140 and 142, respectively. Inquiry 140 checks the 90 second timer of step 138. If the 90 second timer has timed out, inquiry 140 results in a "yes" response advancing state ST9 to step 144 and causing message No. 7 to appear at the display 18. Step 144 is one of those that checks the operation of the complete system. In step 144, the module 12 evaluates the number of times the 90 second timer has timed out, error counter 8 of Table II. If the number of times step 144 has been reached equals the number stored in the module 12 plus one, the machine will complete the present transaction and shut down. If the limit has not been reached, the present transaction will be completed and the machine returned to the initial state. The present transaction is completed by advancing the sequence from step 144 to state ST10.

A "no" response to the inquiry 140 advances state ST9 to inquiry 142 which checks the 30 second timer, step 136. If the 30 second timer has timed out, inquiry 142 produces a "yes" response thereby initiating step 146 which produces a flashing display 18. The message at 18 will be to instruct the user to select the amount of currency desired to be dispensed. Upon either a "no" response to the inquiry 142 or upon completion of step 146, state ST9 advances to the inquiry 148. If an amount of currency to be dispensed has not been selected by the user, inquiry 148 results in a "no" response thereby returning the sequence to inquiry 140. After a user has selected the amount of currency to be dispensed, the inquiry 148 produces a "yes" response and state ST9 advances to step 150. Step 150 activates the cash transport 32 to deliver the number of required currency packets to the cash drawer 20. After delivery of the currency packets to the cash drawer 20, state ST9 is completed and the sequence advances to state ST10.

Initially, in state ST10, message No. 8 of Table I appears at the display 18 and step 152 is completed. In step 152, the electronic module 12 activates a receipt printer to generate a receipt of the transaction. This receipt is transported to the cash drawer 20 in step 154. Upon completion of step 154, state ST10 advances to inquiry 156. Inquiry 156 is made to determine if state ST10 has been reached through states ST1 to ST10 in a normal sequence, or whether an error has advanced the sequence, out of order, to state ST10. In the latter situation, when an error has advanced the sequence to state ST10, the sequence advances to inquiry 158. Inquiry 158 is made to determine whether the error requires the capture of the credit card in the reader 24. A "yes" response will result from inquiry 158 when (1) three attempts have been made to insert an identification code, all of which were erroneous, (2) the expiration date of the card has passed, or (3) the total number of uses has been reached. The result of a "yes" response to inquiry 158 advances the sequence to step 160 wherein the electronic module 12 activates the card reader 24 to deliver the card to the storage bin 30. After completion of step 160, the sequence advances to state ST14, shown in FIG. 7.

If the sequence of operation of the machine has advanced to state ST10 through a normal operating cycle, the inquiry 156 produces a "no" response. This completes state ST10 and advances the operation to step 157 of state ST11. A "no" response to the inquiry 158 also completes state ST10 and advances the sequence to state ST11. The only step completed in state ST11 is that of rescrambling the data to be stored on the magnetic stripe 26.

Upon completion of the scrambling technique, the sequence advances to state ST12 wherein step 162 encodes the magnetic stripe 26 with the scrambled updated data. Step 162 comprises the entire operation of state ST12; upon completion of the encoding of the credit card, the sequence advances to state ST13.

In state ST13, the first operation, step 164, reads the encoded card to check the parity and compare the updated data with data stored in memory in the electronic module 12. Upon completion of step 164, inquiry 166 is made to determine if there are any parity errors. A parity error produces a "yes" response to inquiry 166 and advances the sequence to step 168. Step 168 is an error determining step for checking the overall operation of the machine, error counter 9 of Table II. When the state ST13 has reached step 168, the module 12 checks to determine how many previous occasions this step has been reached. If it equals a preset number of times plus one, four in this case, the sequence advances to complete the present transaction and the machine shuts down. Step 168 will be reached if the result of inquiry 168 is positive or if the inquiry to 170 is negative. Inquiry 170 is made when the inquiry 166 results in a negative answer.

A positive response to the inquiry 170 completes state ST13 and advances the sequence to state ST14, FIG. 7. Upon reaching state ST14, message No. 9 of Table I appears at the display 18 and a return card step 172 is completed. The return card step 172 is performed by the card reader 24 giving the user access to his credit card through the card gate 16. Upon returning the credit card 22 to the card gate 16, a 30 second timer of step 174, and a 90 second timer of step 176, are activated. Following activation of these timers, an inquiry 180 is made to determine if the 90 second timer has timed out before the user removes his card. If the inquiry 180 produces a "yes" response indicating that the 90 second timer of step 176 has timed out, the remainder of state ST14 is bypassed and the sequence advances to state ST15.

A "no" response to the inquiry 180 indicates that the 90 second timer is still running and the sequence advances to the inquiry 182. Inquiry 182 is made to determine if the 30 second timer of step 174 has timed out. A "yes" response to the inquiry 182 advances the sequence to step 184. In step 184, the electronic module 12 flashes message No. 9 of Table I on the display 18 in an effort to attract the user's attention. Upon completion of step 184, that is, flashing the display 18, the sequence of state ST14 advances to inquiry 186. State ST14 also advances to inquiry 186 upon a negative response from the inquiry 182.

Inquiry 186 is made to determine if the user has removed his credit card from the card gate 16. A "no" response to this inquiry returns the sequence to inquiry 180. A positive response to the inquiry 186, indicating that the user has removed his credit card, advances the sequence to inquiry 188. Inquiry 188 is also activated upon a positive response to the inquiry 158 of state ST10. A positive response to inquiry 188 causes message No. 11 of Table I to appear at the display 18 and a negative response to this inquiry causes message No. 10 of Table I to appear at the display 18. In either case, state ST14 advances to step 190. In step 190, the electronic module 12 activates the latch 52 and energizes the linear motor 48 to position the cash drawer 20 to the detent position. At the same time a thirty second timer of step 192 is activated. Inquiry 194 is made as a check to determine when the timer of step 192 has timed out. A negative response to step 194 advances the sequence of state ST14 to inquiry 196. Inquiry 196 is made to determine if the cash drawer has been extended to facilitate removal of its contents. A "no" response to inquiry 196 returns the sequence to inquiry 194. A "yes" response to inquiry 196 advances the sequence of state ST14 to step 198.

State ST14 also advances to step 198 upon a positive response to the inquiry 194. Such a response advances the sequence to step 200 which is a flashing light operation to cause the display 18 to flash either message No. 10 or message No. 11. After the flashing operation has commenced, inquiry 202 is made to determine if the cash drawer 20 has been extended to remove the contents thereof. A "no" response to the inquiry 202 advances the sequence to step 204 which is an error counter operation. In step 204, the electronic module 12 checks to determine in how many successive sequences has the drawer not been opened after advancing to this step. If the step 204 has been activated a number of times equal to a preset value stored in the electronic module 12, error counter 10 of Table II, the system will complete the present transaction and shut down.

Upon a "yes" response to the inquiry 202 or upon a completion of the step 204, state ST14 advances to step 198. Step 198 includes a 5 second timer for timing how long the cash drawer is held in the detent position after being manually extended. Upon starting the 5 second timer of step 198, inquiry 201 is made to check the operation of the timer. A "no" response to the inquiry 201 indicates that the 5 second timer has not timed out and inquiry 201 is continuously made until a positive response results.

A positive response to the inquiry 201 advances the sequence to step 202 which activates the latch 52 to allow the spring 50 to automatically retract the cash drawer 20. A latch then locks the cash drawer 20 until the next transaction.

Upon completion of the step 202, an inquiry 204 is made. Inquiry 204 is made to determine if any of the error counter steps have been activated. If any of the error counting steps have been activated, the inquiry 204 produces a positive response.

A positive response to the inquiry 204 completes state ST14 and advances the sequence to state ST15. The sequence of state ST15 is also initiated as the result of a positive response to the inquiry 180 of state ST14. Initially, message No. 12 of Table I appears at the display 18 and a step 206 is activated to start a six second timer. The entire purpose of state ST15 is to display message No. 12 and turn off the display lights. This state includes inquiry 208 which cycles until the timer of step 206 has timed out. At that time, the inquiry 208 produces a "yes" response thereby activating step 210 to turn off the display lights. State ST15 is completed by inquiry 212 and step 214.

If the inquiry 204 results in a negative response, indicating that currency was dispensed without activating any of the error counting steps, the sequence advances to state ST16. State ST16 is a state in which the machine resets itself in preparation for another cycle. Initially, in state ST16, an inquiry 216 is made. A positive response to inquiry 216 activates step 218 and a negative response activates step 220. Both steps 218 and 220 ready the console 10 for inquiry 54 of state ST1.

CASH DISPENSER

In state ST9, step 150, the cash transport 32 was actuated by a control signal from the module 12 to deliver currency packets to the cash drawer 20. Referring to FIGS. 8–15, there is shown a cash transport system for the delivery of currency packets from the container 36 to the cash drawer 20. The container 36 is fastened to a housing side plate 230 and includes an outlet port 232 at the front plate. A metering gate 234 is attached to the container front plate and meters the number of currency packets delivered from the container 36 during one cycle of the friction drive assembly 236.

The metering gate 234, as best illustrated in FIG. 12, includes a separator plate 238 positionable vertically by means of a retaining bracket 240 fastened to the front plate 242 of the container 36. By vertically adjusting the separator plate 238 with respect to the bottom plate 244 of the container 36, one currency packet at a time will be delivered from the container to the transport system, to be described.

Figure 10:
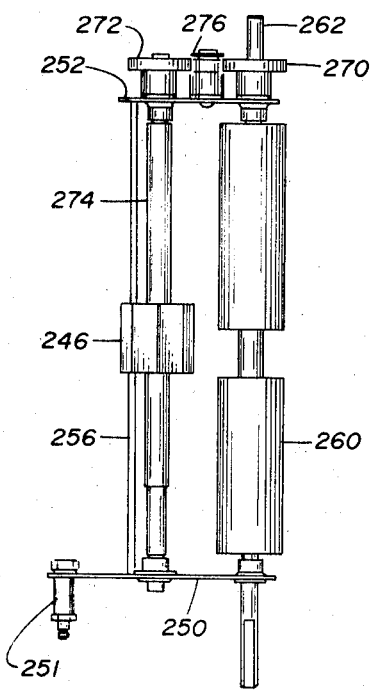
FIG. 10 is a top view of a friction drive roller assembly for feeding currency packets from a storage container to a pinch roller system.
Figure 11:
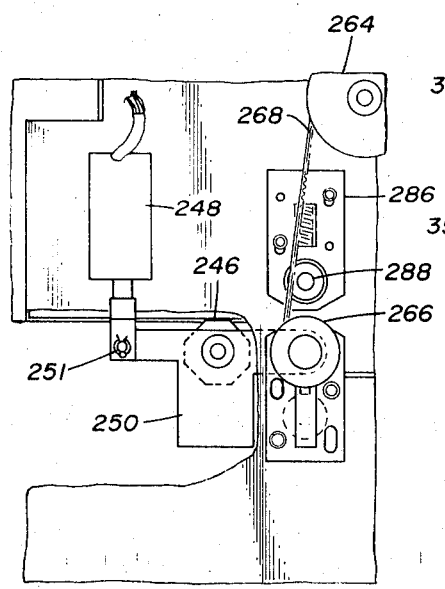
FIG. 11 illustrates a portion of the left side of the cash transport as viewed from FIG. 9 showing the friction drive roller actuating mechanism.
Figure 13:
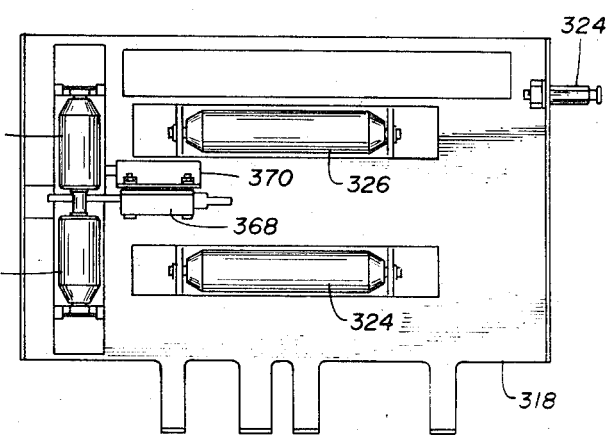
FIG. 13 is a bottom view of a divert door assembly for aborting a packet delivery upon a system malfunction.

To deliver a currency packet from the container 36, the continuous rotating friction roller 246 of the assembly 236, also illustrated in FIG. 10, is moved into the position illustrated in FIG. 11 by a solenoid 248 coupled to the left side plate 250 through an extending pin 251. The left side plate 250 and the right side plate 252 along with spacer bars 256 and 258 comprise a supporting structure for the friction roller 246 and for a drive roller 260. Roller 260 is supported on a support shaft 262 which also serves as a pivot point for the friction drive assembly.

Rotation of the friction roller 246 and the drive roller 260 is provided by a drive motor 264 coupled to a timing pulley 266 through a timing belt 268. The timing pulley 266 is attached to the support shaft 262 of the drive roller 260. Rotation of the friction roller 246 is through a drive gear 270 on the shaft 262 and a drive gear 272 on a shaft 274 supporting the friction roller 246. An idler gear 276 couples the motion of the drive gear 270 to the drive gear 272 such that when the roller 260 is rotated, the friction roller 246 will also be rotating.

In operation of the friction drive assembly 236, energizing the drive motor 264 by a signal from the module 12 causes rotation of the drive roller 260 and the friction roller 246. At this time, the assembly 236 pivots to a counterclockwise position from that illustrated in FIGS. 8 and 11, and the friction roller 246 is rotating freely. Upon the proper energizing signal from the module 12 during step 150 of the state ST9, the solenoid 248 is energized to move the assembly 236 to the position illustrated in FIGS. 8 and 11.

The friction roller 246 now comes in contact with the bottom currency packet in the container 36 causing it to be forced through the metering gate 234 and into contact with the drive rollers 260 and 284. As the currency packet reaches the area of the drive roller 260, it trips a switch arm 278 of a microswitch 280 supported by the container 36 on a bracket 282. Tripping the microswitch 280 interrupts a circuit to the solenoid 248 thereby causing it to be deenergized. The assembly 236 now pivots counterclockwise, by the force of gravity, around the shaft 262. Thus, following a command signal from the module 12, one currency packet will be delivered from the container 36.

The drive roller 260 is part of a pinch roller pair including an idler roller 284 urged in contact with the drive roller by means of spring loaded bearing brackets, such as the bracket 286 of FIG. 11. One such bracket is provided for each end of the shaft 288 supporting the idler roller 284.

As a currency packet is delivered to the pinch roller pair comprising rollers 260 and 284, it is transported to a second pinch roller pair that includes a drive roller 290 and an idler roller 292. The drive roller 290 is supported on a shaft 294 which has a timing pulley (not shown) attached thereto that is driven by the motor 264 through the timing belt 268. The idler roller 292 is spring loaded into contact with the drive roller 290 by means of brackets similar to the bracket 286.

As a currency packet is being delivered from the first pinch roller pair of rollers 260 and 284 to the second pinch roller pair including rollers 290 and 292, it passes an excess packet sensor assembly 296. The sensor assembly 296 consists of a sensor lever 298, mounted to pivot about a shaft 306, with a sensor roller 300 supported at its lower end along the path of a currency packet from the container 36. A roller 300 is supported at the lower end of the sensor lever 298 and is normally in contact with a sensor plate 302. A spring 304, attached between a support plate 374 and the sensor lever 298, pivots the entire sensor assembly 296 into the position shown about the pivot shaft 306. The pivot shaft 306 is mounted to the support plate 374. With this construction, the lever 298 is free to pivot about the shaft 306 by a currency packet passing between the sensor support 302 and the roller 300.

As a currency packet passes between the sensor roller 300 and the sensor support 302, it pivots the lever 298 about the pivot 306 thereby extending the spring 304. As the lever 298 pivots about the shaft 306, it engages a switch arm 312 as part of a microswitch 314. By adjusting the spaced relationship between the lever 298 and the switch arm 312 of the microswitch 314, a predetermined amount movement of the lever 298 is possible without actuating the microswitch 314. Thus, the excess currency packet assembly 296 may be adjusted to allow one currency packet to pass from the container 36 without tripping the microswitch 314. However, should two currency packets be transported through the first pinch roller pair as a result of a malfunction, the lever 298 will pivot an amount to actuate the microswitch 314.

Actuating the microswitch 314 in turn activates a divert mechanism 316 to divert the currency packets as they pass through the second pinch roller pair into the bottom of a cash dispenser. This prevents dispensing of currency having a greater dollar value than selected by a user.

The divert mechanism 316 comprises a divert door 318 pivoted to the left side plate 230 and the right side plate (not shown) on a pivot shaft 320. A leveling bracket 322, bolted to the side plate 230, sets the door 318 in a level position as illustrated. Upon actuating the microswitch 314, a solenoid (not shown) attached to a solenoid pin 324 rotates the divert door 318 clockwise about the pivot shaft 320 to divert the currency packets passing through the pinch rollers 290 and 292.

After the currency packets have passed the excess packet sensor assembly 296, the microswitch 314 returns to its normal position thereby deenergizing the solenoid supporting the divert door 318. The divert door 318 now returns to its normal level position.

During normal operation when a single currency packet passes the sensor assembly 296, it is transported over the divert mechanism 316 on rollers 324 and 326. A currency packet advances over the divert mechanism on the rollers 324 and 326 by means of flexible belts 328 and 330. These belts are driven by the idler roller 292 of the second pinch roller pair and the idler roller 332 of a third pinch roller pair. This third pinch roller pair includes a drive roller 334 supported on a shaft 336. A drive motor 340 rotates the roller 334 through a timing belt 342 and a timing pulley 338.

As a currency packet passes the third pinch roller pair, it is delivered into the cash drawer 20. When it passes through the third pinch roller pair, it actuates a microswitch 344 that energizes a solenoid (not shown) to step a counter 346. The counter 346 maintains a running count of the number of packets of currency delivered from the container 36 to the cash drawer 20.

In the overall operation of the cash transport 32, a signal from the module 12 rotates the friction roller 246 into a position to deliver a currency packet through the metering gate 234 to the first pinch roller pair. As the currency packet passes the first pinch roller pair, it actuates the microswitch 280 to deenergize the solenoid 248 to drop the friction roller 246 out of engagement with the currency packets.

The first friction roller pair continues transporting the currency packet past the excess packet sensor assembly 296 into the second pinch roller pair. The flexible belts 328 and 330 pick up the currency packet for movement over the divert door 318 to the third pinch roller pair. The third pinch roller pair provides the final forward motion to a currency packet to be delivered into the cash drawer 20. As the packet passes through the third pinch roller pair, it is counted in the running counter 346.

Upon the delivery of a currency packet into the cash drawer 20, step 150 of state ST9 is completed and the dispensing sequence advances to step 152 of state ST10. Step 152 causes a receipt of the transaction to be printed and delivered to the cash drawer 20. This printed receipt is delivered to the cash drawer 20 by the cash transport 32.

A printed receipt from a receipt printer (not shown) enters the cash transport 32 through a slot 348 in the side plate 230. Upon passing through the side plate 230, the receipt passes over the divert door 318 between the rollers 324 and 326 and the flexible belts 328 and 330. A receipt is transported into this position by means of a form feed roller 350 and form feed rollers 354 and 356. Rollers 354 and 356 rotate in bushings as part of the divert door 318. The form feed rollers are mounted on axes that are transverse to that of the rollers 324 and 326. Thus, the receipt enters the transport at right angles to the path of the currency packet delivery.

The form feed roller 350 is driven by the drive motor 264 through miter gears 358 and 360. Miter gear 358 is coupled to the shaft 294 and the miter gear 360 is coupled to a shaft 362; the roller 350 is keyed to the shaft 362. The form feed roller 350 is supported by a bracket 364 that pivots about the shaft 262. This bracket is spring loaded into the horizontal position by means of a spring 366 attached to the side plate 230. Rotation of the bracket 364 is provided to accommodate the movement of the divert door 318 upon actuation of the divert assembly by closing the microswitch 314.

As a printed receipt passes through the form feed roller 350 and the roller pair including the rollers 352 and 354, it actuates a microswitch 368 attached to the divert door 318 by means of a bracket 370. Actuating the microswitch 368 energizes a solenoid 372 attached to the support plate 374 that is positioned from and mounted to the side plate 230 by means of spacer bars 376 and 378. The solenoid 372 provides power to lift a release plate 380 to disengage feed rollers 382 and 384 from the flexible belt 328. A similar arrangement of feed rollers (not shown) on the opposite side of the release plate 380 engages the flexible belt 330. With the solenoid 372 energized, the feed rollers 382 and 384 are in the position shown thereby providing a space between the flexible belt 328 and the rollers 324 and 326 to permit entry of a printed receipt.

After the printed receipt has entered the area of the rollers 324 and 326, the solenoid 372 is deenergized allowing the release plate 380 to drop and the rollers 382 and 384 again engage the flexible belt 328. This forces the flexible belt into contact with the rollers 324 and 326. The printed receipt is then transported to the third pinch roller pair including rollers 332 and 334 for delivery to the cash drawer 20.

To guide a printed receipt into the delivery system, a guide assembly including the bracket 386 is mounted to the support plate 374 by spacers 388 and 390. Three parallel receipt guides 392 are attached to the bracket 386 to be about one-sixteenth inch above the divert door 318. These guides provide positive direction to a printed receipt. To allow the divert door 318 to pivot during a divert operation, each of the guides 392 is spring supported by means of springs 394.

Figure 17:
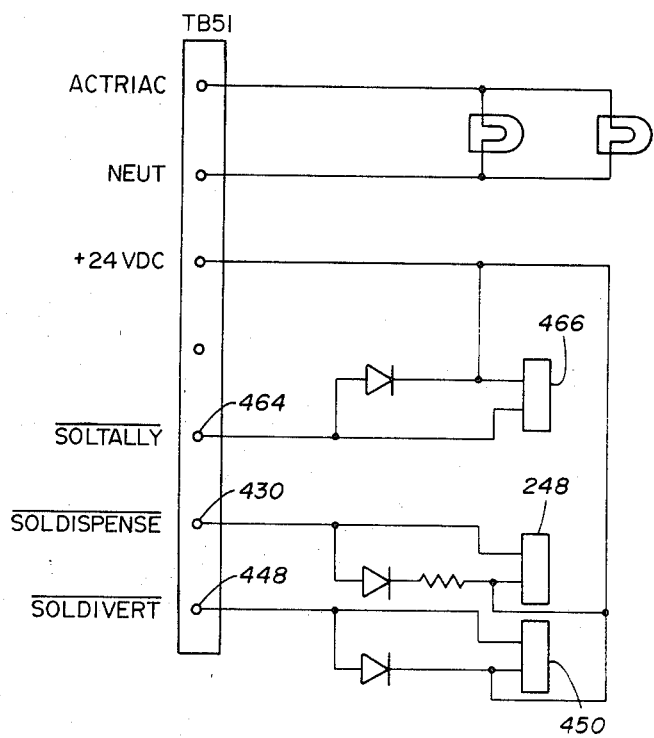
FIG. 17 is a schematic of the electronic actuators for operation of the cash transport.
Figure 16:
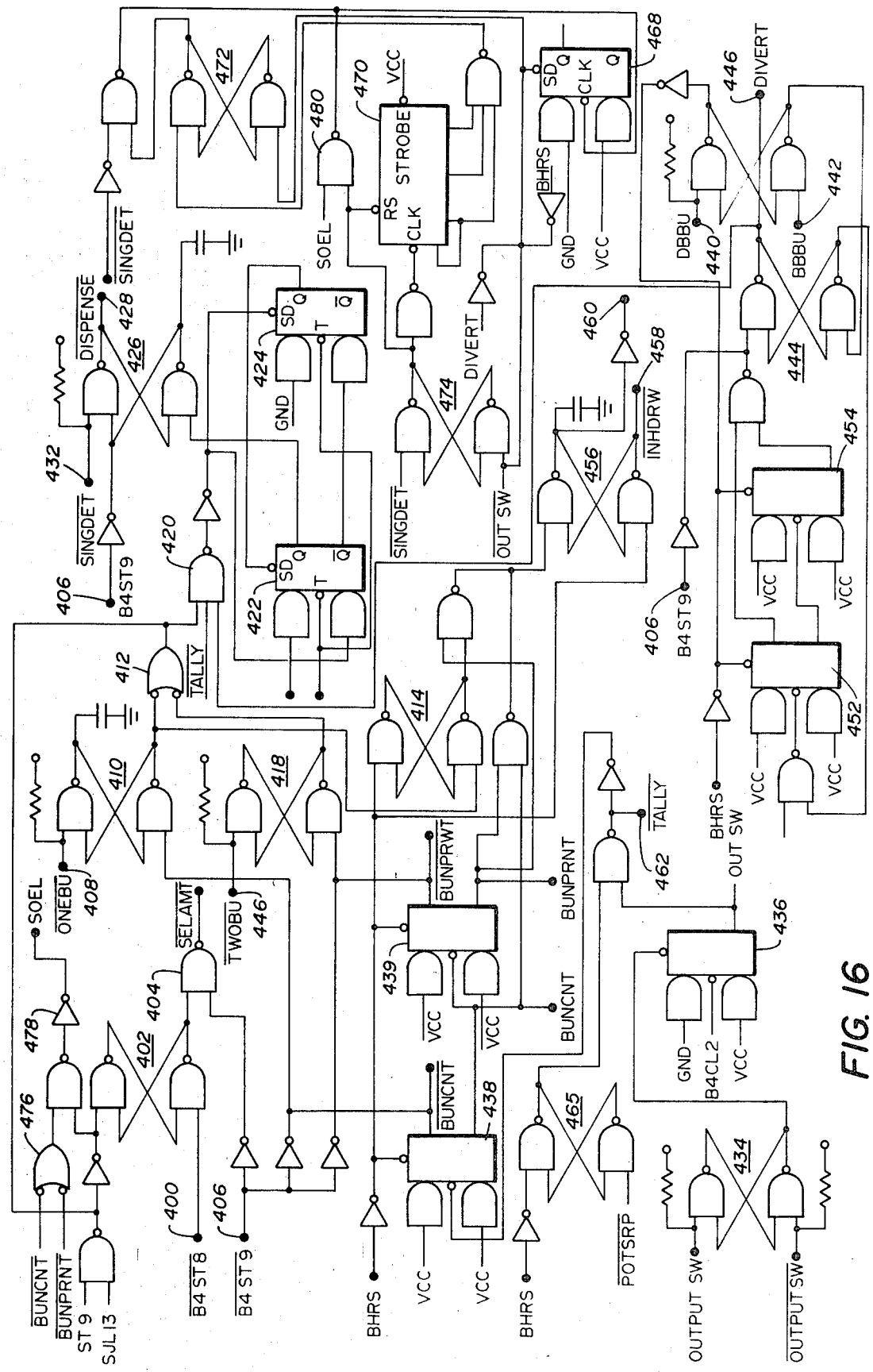
FIG. 16 is an electrical schematic of a logic system for controlling the operation and timing of the cash transport.

To sequence the operation of the cash transport 32 with the remaining operation of the system, the module 12 includes logic circuitry such as schematically illustrated in FIG. 16. This logic circuitry generates voltages to energize the drive motors 264 and 340 along with the various actuating solenoids of the cash transport 32, as illustrated by the schematic of FIG. 17. During the sequence of operation of state ST8, the module 12 generates an instruction signal at the terminal 400 of the logic circuit of FIG. 16 to enable the bistable circuit 402 thereby generating a logic ONE signal to the NAND gate 404. At the start of the sequence of state ST9, an instruction signal is produced on the terminals 406; this also results in a logic ONE input to the NAND gate 404. This second signal to the NAND gate 404 generates a command signal to cause message No. 6 of Table I to appear at the display 18. This instructs a user to select one of two amounts of currency through the packet push button keys 14 on the front plate of the console 10. By actuating the appropriate packet number push button, the user sets the logic circuitry to deliver either one or two currency packets from the container 36 to the cash drawer 20.

Actuating the smaller dollar value of the two packet push buttons, the user causes a signal to be generated at the terminal 408 to enable the bistable circuit 410 that produces a logic ONE signal at the input of an OR gate 412. This logic ONE signal is also applied to a bistable circuit 414. By actuating the larger dollar value of the two packet push buttons, the user causes a command signal to appear at the terminal 416 to enable the bistable circuit 418 to likewise produce a logic signal level at an input of the OR gate 412.

Either of the logic ONE inputs to the OR gate 412 results in one of the inputs to a NAND gate 420 being at the logic ONE level. With two additional logic ONE signals to the NAND gate 420, flip-flops 422 and 424 change states thereby enabling the bistable circuit 426 to produce a dispense command signal on a terminal 428.

A dispense command signal at the terminal 428 is applied to a terminal 430 of FIG. 17 to energize the solenoid 248 to move the roller 246 in contact with the bottom currency packet in the container 36. As explained, the packet is delivered from the container 36 by the roller 246. This packet subsequently actuates a microswitch 280 which generates a signal at a terminal 432 to reset the bistable circuit 426 to deenergize the solenoid 248.

The transported packet is delivered to the cash drawer 20 and counted by the microswitch 344 as it passes the third pinch roller pair. Actuating the microswitch 344 enables the bistable circuit 434 thereby setting the flip-flop 436. Setting the flip-flop 436 advances a counting circuit consisting of flip-flops 438 and 439. An output from the flip-flop 436 also resets the bistable circuit 434. If only one currency packet is to be delivered from the container 36, advancing the flip-flop 438 changes the state of the bistable circuit 410 and the operating sequence advances to state ST10 for printing and delivering a transaction receipt to the cash drawer 20.

If the user has selected a two packet push button key, after the first packet has been delivered to the cash drawer 20, the dispense command signal at the terminal 428 again energizes the solenoid 248 to deliver a second currency packet from the container 36. This again enables the bistable circuit 434 to set the flip-flop 436 and advance the bundle counter of flip-flops 438 and 439. After the second packet has passed the microswitch 344, the bistable circuit 418 is reset and the output of the NAND gate 420 goes to logic ONE thereby disenabling the bistable circuit 426.

Should a double bundle be detected by the excess packet sensor 296, a double bundle signal appears at the terminals 440 and 442 thereby enabling the bistable circuit 444 to produce a divert command signal at the terminal 446. A signal at the terminal 446 is applied to the terminal 448 of FIG. 17 thereby energizing a solenoid 450 to rotate the divert door 318 and cause the double bundle to be diverted from along the transport path.

A double bundle signal at the terminals 440 and 442 also resets the flip-flops 452 and 454 to disenable the NAND gate 420 from enabling the bistable circuit 426; this prevents a dispense command signal from being generated at the terminal 428.

At the completion of the delivery of the required number of currency packets to the cash drawer 20, and the delivery of a receipt of the transaction, the bistable circuit 414 changes states thereby enabling a bistable circuit 456 to produce a cash drawer control signal at a terminal 458 to enable the cash drawer 20 to be unlocked and opened in step 190 of state ST14. A signal also appears at the terminal 460 to advance the operating procedure to the scramble data step of state ST11.

As each of the currency packets passes the microswitch 344, a "tally" signal is generated at the terminal 462 which is applied to terminal 464 of FIG. 17 to energize a solenoid 466 of the counter 346. This advances the running count of the counter 346 as explained.

During the completion of state ST16, a reset signal "BHRS" is applied to various bistable circuits of the logic system. This resets the system for a subsequent operation. This reset signal returns the flip-flops 438 and 439 to a ready state and resets the bistable circuit 456 thereby producing a drawer inhibit signal at the terminal 458. The reset signal also returns the bistable circuit 464 in the tally and packet count section to an initial state. Further, the reset signal returns the flip-flops 452 and 454 to the original state and also resets the flip-flop 468. The flip-flop 468 is part of a timing section that includes a shift register 407 and the bistable circuits 472 and 474.

Throughout the logic diagram of FIG. 16 several interconnecting lines have common signals and are identified by a similar identification code. Interconnecting lines that have the same signal were not interconnected in order to simplify the drawing to the extent possible. Thus, for example, one output of each of the flip-flops 438 and 439 is connected to an input to the OR gate 476. Similarly, the output of the inverting amplifier 478 is coupled to the input of a NAND gate 480.

By appropriate command signals applied to the terminal 400 and the terminals 406, the logic circuit of FIG. 16 sequences the operation of the cash transport 32 to operate as explained. The command signals generated at various output terminals of the circuit of FIG. 16 are applied to terminals of the circuit of FIG. 17 to energize and deenergize the transport solenoids.

The method of unscrambling data in accordance with coding keys and rescrambling data in accordance with other coding keys described herein is described and claimed in the co-pending application Ser. No.

59,146, filed July 29, 1970, of Kenneth S. Goldstein and John D. White.

The cash drawer of the dispensing system described herein is described and claimed in the co-pending application Ser. No. 59,156, filed July 29, 1970, of Marion R. Karecki and Thomas R. Barnes.

A system for sequencing the operation of the cash dispenser described herein is described and claimed in the co-pending application Ser. No. 59,150, filed July 29, 1970, of Thomas R. Barnes, George R. Chastain and Don C. Wetzel.

The card transport and gate control system described herein is described and claimed in the co-pending application Ser. No. 59,241, filed July 29, 1970, of John R. Hicks and William C. Bortzfield.

While only one embodiment of the invention, together with modifications thereof, has been described in detail herein and shown in the accompanying drawings, it will be evident that various modifications are possible without departing from the scope of the invention.

What is claimed is:

1. In a sequence operated currency dispensing system having a cash drawer into which currency and a receipt are delivered, comprising in combination:
   a container for storing currency to be delivered to the cash drawer through a container outlet port,
   currency transport rollers including a first pair of pinch rollers and second pair of pinch rollers having flexible belts extending between the pairs of rollers to transport and deposit in the cash drawer currency from said container and including a pair of feed rollers for maintaining the flexible belts in contact with currency being delivered,
   receipt transport rollers mounted transversely to said currency transport rollers for delivery of a receipt of the currency deposited in the cash drawer to said currency transport rollers for depositing in the cash drawer, and
   control means for sequentially energizing said currency transport rollers to activate such rollers to deliver currency from said container to the cash drawer and in turn energizing said receipt roller for delivery of a receipt to the currency transport rollers.

2. In a sequence operated currency dispensing system as set forth in claim 1 wherein said control means includes a first motor for driving said first and second pair of pinch rollers, a second motor for driving said third pair of pinch rollers, and circuit means for energizing said motors in response to a cash dispensing signal.

3. In a sequence operated currency dispensing system as set forth in claim 1 including metering means at the outlet port of said container for controlling the amount of currency simultaneously delivered through the outlet port.

4. In a sequence operated currency dispensing system as set forth in claim 3 wherein said control means includes means for controlling the position of said feed rollers to release the maintaining pressure on the flexible belts during delivery of a receipt by the receipt transport rollers to the currency transport rollers.

5. In a sequence operated currency dispensing system as set forth in claim 3 including divert means for directing currency from said currency transport rollers when more than a preselected amount of currency passes said metering means.

6. In a sequence operated currency dispensing system as set forth in claim 5 including means for sensing when an excess amount of currency simultaneously passes said metering means to activate said divert means.

7. In a sequence operated currency dispensing system as set forth in claim 6 including a feed roller in said container and actuated by said first motor to deliver currency through said metering means to said first pair of pinch rollers.

8. In a sequence operated currency dispensing system having a cash drawer into which currency and a receipt are delivered, comprising in combination:
   a container for storing currency to be delivered to the cash drawer through a container outlet port,
   metering means at the outlet port of said container for controlling the amount of currency simultaneously delivered through the outlet port,
   currency transport means for taking the currency from said container for delivery to and depositing in the cash drawer,
   receipt transport means for delivering a receipt of the currency deposited in said cash drawer to said currency transport means for depositing in the cash drawer, and
   control means for sequentially energizing said currency transport means and said receipt transport means to complete delivery of currency and a receipt to the cash drawer.

9. In a sequence operated currency dispensing system as set forth in claim 8 wherein said currency transport means includes pairs of pinch rollers for advancing currency to said cash drawer.

10. In a sequence operated currency dispensing system as set forth in claim 8 including means for counting the currency delivered from said container to the cash drawer.

11. In a sequence operated currency dispensing system as set forth in claim 8 including delivery means in said container for advancing currency through said metering means to said currency transport means.

12. In a sequence operated currency dispensing system as set forth in claim 8 wherein said control means includes means for rendering ineffective the currency transport means during delivery of a receipt thereto by the receipt transport means.

13. In a sequence operated currency dispensing system as set forth in claim 12 including divert means for directing currency from said currency transport means when more than the established amount of currency passes said metering means simultaneously.

14. In a sequence operated currency dispensing system as set forth in claim 13 including means for detecting when an excess amount of currency simultaneously passes said metering means to activate said divert means.

15. In a sequence operated currency dispensing system having a cash drawer into which currency and a receipt are delivered, comprising in combination:
   a container for storing currency to be delivered to the cash drawer through a container outlet port, means receiving currency from said container for transporting to and depositing in the cash drawer, receipt transport means for delivering a printed receipt to said means receiving currency to be transported thereby and deposited in the cash drawer, and control means for energizing said means receiving currency and said receipt transport means to deliver the currency and the printed receipt to the cash drawer.

16. In a sequence operated currency dispensing system as set forth in claim 15 wherein said means receiving currency includes a first pair of pinch rollers and a second pair of pinch rollers having flexible belts extending therebetween to transport the currency and printed receipt to said cash drawer.

17. In a sequence operated currency dispensing system as set forth in claim 16 wherein said receipt transport means includes feed form rollers having axes transverse of the axis of said first and second pinch roller pairs for delivering a printed receipt to said flexible belts.

18. In a sequence operated currency dispensing system as set forth in claim 17 including means for disengaging said flexible belts to permit transporting of the printed receipt to said first and second pinch roller pairs.

19. In a sequence operated currency dispensing system as set forth in claim 15 including a metering gate at the outlet port of said container for controlling the amount of currency simultaneously delivered through the outlet port.

20. In a sequence operated currency dispensing system as set forth in claim 19 including divert means for directing currency from said means receiving currency when more than the established amount of currency simultaneously passes said metering gate.

21. In a sequence operated currency dispensing system as set forth in claim 20 including means for detecting when an excess amount of currency simultaneously passes said metering gate to activate said divert means.

22. In a sequence operated currency dispensing system as set forth in claim 21 including means for counting the currency delivered from said container to the cash drawer.

* * * * *